United States Patent [19]
van Rooy et al.

[11] Patent Number: 5,564,550
[45] Date of Patent: Oct. 15, 1996

[54] ADAPTING ESCALATOR SPEED TO TRAFFIC USING FUZZY LOGIC

[75] Inventors: Jean-Pierre van Rooy, Farmington; Joseph Bittar, Avon; David J. Sirag, Jr., Manchester; Bruce A. Powell, Canton, all of Conn.

[73] Assignee: Otis Elevator Company, Farmington, Conn.

[21] Appl. No.: 309,221

[22] Filed: Sep. 20, 1994

[51] Int. Cl.$^6$ .......................... B65G 15/00; G06F 17/00; B61K 1/00
[52] U.S. Cl. .......................... 198/322; 198/321; 395/61; 395/900; 104/20
[58] Field of Search .................... 395/3, 61, 900; 198/340, 321, 322; 104/20

[56] References Cited

U.S. PATENT DOCUMENTS

| | | | |
|---|---|---|---|
| 3,665,863 | 5/1972 | Patin | 104/25 |
| 3,844,219 | 10/1974 | Jenkins | 104/25 |
| 4,232,776 | 11/1980 | Dean | 198/322 |
| 4,631,467 | 12/1986 | Herrmann et al. | 318/798 |
| 4,748,394 | 5/1988 | Watanabe | 318/807 |
| 5,165,595 | 11/1992 | Horio et al. | 236/49.3 |
| 5,241,651 | 8/1993 | Ueda | 395/61 |
| 5,266,756 | 11/1993 | Hatano | 187/111 |

OTHER PUBLICATIONS

Waller, L., "Fuzzy Logic: It's comprehensible, it's practical–andit's commercial", Electronics, Mar. 1989.

Primary Examiner—Robert W. Downs
Assistant Examiner—A. Katbab

[57] ABSTRACT

In one embodiment, fuzzy sets indicative of the degree to which the time since the last passenger boarded an escalator can be deemed to be zero, a very long time, or something in between, are combined with fuzzy sets indicative of the extent to which the maximum number of passengers in a recent temporal or cyclic period can be deemed to be a zero passenger, a very large group, or something in between. In another embodiment, fuzzy sets indicative of the degree to which the time since the last passenger exited an empty escalator can be deemed to be nearly zero, a very long time, or something in between, are combined with fuzzy sets indicative of the degree to which the maximum group of passengers on the escalator at any time since the last time it was empty can be deemed to be a single passenger, a very large group, or something in between. T-norms (functions for combining the pair of fuzzy sets) are used to select recommended target speeds; weighted averaging of more than one recommended target speed is used to defuzzify the result to achieve an ultimate target speed, except in the second embodiment, which tailors the speed of the escalator to the current traffic level where the target speed is always maximum if the escalator is occupied and which judiciously slows an empty escalator.

17 Claims, 8 Drawing Sheets

|  | TIME SINCE LAST PASSENGER LEFT |  |  |  |  |  |  |
|---|---|---|---|---|---|---|---|
|  | CURRENTLY OCCUPIED | NEARLY ZERO | SHORT | MEDIUM | LONG | VERY LONG |  |
| VERY LARGE | F | F | F | M | S | O | E=1 |
| LARGE | F | F | M | M | S | O | E=2 |
| MEDIUM (SIZE OF LAST GROUP) | F | F | M | S | S | O | E=3 |
| SMALL | F | M | S | S | O | O | E=4 |
| ONE PASSENGER | F | M | S | O | O | O | E=5 |
|  | D=1 | D=2 | D=3 | D=4 | D=5 | D=6 |  |

F — FULL SPEED ($V_{MAX}$)
M — MODERATE SPEED (.5$V_{MAX}$)
S — SLOW SPEED (.3$V_{MAX}$)
O — OFF fig. 7
E=1 fig. 8
E=2 fig.12

|  | CURRENTLY NEARLY ZERO OCCUPIED | | SHORT | MEDIUM | LONG | VERY LONG |  |
|---|---|---|---|---|---|---|---|
| VERY LARGE | F | F | F | M | S | O | E=1 |
| LARGE | F | F | M | M | S | O | E=2 |
| MEDIUM | F | F | M | S | S | O | E=3 |
| SMALL | M | M | S | S | O | O | E=4 |
| ONE PASSENGER | S | S | S | O | O | O | E=5 |
|  | D=1 | D=2 | D=3 | D=4 | D=5 | D=6 |  |

← TIME SINCE LAST PASSENGER BOARDED →

SIZE OF LAST GROUP

F — FULL SPEED ($V_{MAX}$)
M — MODERATE SPEED ($.5V_{MAX}$)
S — SLOW SPEED ($.3V_{MAX}$)
O — OFF fig.13

|  | TIME SINCE LAST PASSENGER LEFT | | | | | |
|---|---|---|---|---|---|---|
| SIZE OF LAST GROUP | CURRENTLY OCCUPIED (D=1) | NEARLY ZERO (D=2) | SHORT (D=3) | MEDIUM (D=4) | LONG (D=5) | VERY LONG (D=6) |
| VERY LARGE (E=1) | F | F | F | M | S | O |
| LARGE (E=2) | F | F | M | M | S | O |
| MEDIUM (E=3) | F | F | M | S | S | O |
| SMALL (E=4) | F | M | S | S | O | O |
| ONE PASSENGER (E=5) | F | M | S | O | O | O |

F — FULL SPEED ($V_{MAX}$)
M — MODERATE SPEED ($.5 V_{MAX}$)
S — SLOW SPEED ($.3 V_{MAX}$)
O — OFF fig.16

5,564,550

ADAPTING ESCALATOR SPEED TO TRAFFIC USING FUZZY LOGIC

TECHNICAL FIELD

This invention relates to determining the commanded speed of a variable speed escalator in response to analysis of traffic history utilizing fuzzy logic rules.

BACKGROUND ART

Variable speed escalators are known, an example of which is described in Elevator World, January 1994, pages 92 and 94. However, it appears that control thereof has thus far been limited to establishing a single predetermined speed for each installation, rather than varying the speed at a given installation, during normal use of the escalator.

In the past few decades, interest in conservation has led to a variety of schemes for saving energy in the movement of people within buildings. For instance, studies have been made of the possibility of saving energy by shutting an escalator off (allowing it to come to rest) whenever it is carrying no passengers. However, such studies show that the cost of restarting the escalator upon the presence of a passenger typically exceeds the savings which may result from being shut down for a short period of time. In any event, the studies determine that the savings resulting from shutting an escalator down have so far ranged from negative values (utilizing more energy than allowing the escalator to continuously run) to average savings that are so small as to not warrant the additional inconvenience to the passengers and expense to the building owners.

DISCLOSURE OF INVENTION

Objects of the invention include altering the operation of an escalator during periods of light traffic so as to conserve energy.

One predication of the invention is that shutting off an escalator in the absence of passengers and restarting the escalator in the presence of a passenger may not save energy because the cost of accelerating from a full rest position is offset only by long periods of rest (e.g., tens of minutes) between passengers. Another predication of the invention is that traffic history can be utilized to determine the nature of and/or likelihood of success of altered escalator operation which can result in energy savings.

According to the present invention, the traffic history of an escalator is analyzed using fuzzy logic to determine a target speed which will on average result in saving energy during periods of light traffic. According to the invention in one form, the target speed of an escalator is selected in accordance with the present and recent history of traffic on the escalator. In still further accord with this aspect of the invention, the target speed of the escalator is selected on the basis of fuzzy sets expressing the likelihood that an interval related to the last passenger boarding and the size of the largest recent group of passengers represent light traffic. In accordance with one embodiment of the invention, the speed at which an escalator carries passengers is targeted according to the time the last passenger boarded and the largest group which has been on the escalator at one time in a recent temporal or cyclic interval. In accordance with another embodiment of the present invention, an empty escalator is provided a target speed which is selected in accordance with the length of time and the maximum number of passengers which the escalator has carried, since the previous time that it was empty.

In the exemplary embodiments herein, the target speed is selected as the centroid of several target speed recommendations, which may be for the same or different speeds, determined as the T-norm of membership values determined from fuzzy sets related to size of the passenger groups on the escalator at one time during a recent operational, temporal or cyclic interval of time, and a period of time related to the time that has elapsed since the last passenger boarded the escalator. In one embodiment, the period of time is the time that has lapsed since the last passenger boarded, and the group interval is a recent period determined by escalator tread cycles, but it could be time. In another embodiment the size of the groups of passengers on the escalator at one time since the last time it was empty is used along with the time since the last passenger exited an empty escalator. According to the invention, the T-norms of time fuzzy sets and group size fuzzy sets relate to recommended target speeds, which may vary from three or four speeds to ten or more speeds, as desired. Averaging out the T-norm recommendations (the centroid method of combining fuzzy logic results) can yield a wide variety of target command speeds between the minimum speed (which may be zero or not) and the maximum speed (which is typically 100 percent of rated speed). In the second embodiment of the invention, which controls the manner of reacting to an empty escalator to reduce its speed judiciously, the ultimate target speed may be total rest (zero velocity) or it may be a creep speed which is small so as to save significant energy, while being large enough to avoid excessive slow speed jerk, and thereby permit low cost resumption of full speed, in contrast with the difficulty of overcoming static friction when accelerating an escalator from total rest.

The invention may be implemented in a wide variety of forms using only apparatus and technology which is widely available in the light of the specific teachings which follow hereinafter.

Other objects, features and advantages of the present invention will become more apparent in the light of the following detailed description of exemplary embodiments thereof, as illustrated in the accompanying drawing.

BEST MODE FOR CARRYING OUT THE INVENTION

The present invention uses fuzzy arithmetic to combine time fuzzy sets with fuzzy sets related to numbers of passengers, by multiplying each of one with each of the other. To determine the degree of likelihood that, for instance, the size of the last group is small and the time since the last passenger boarded is medium, requires determining the T-norm of the two fuzzy sets.) This can be done by any known method such as multiplication, minimization, or other method, but in the present example, the minimization method will be chosen since it simply requires selecting the minimum membership value of the two membership values resulting from the actual "size of last group" basis element and "time since last passenger boarded" basis element, used as arguments in a table lookup into tables representing each of the fuzzy sets.

In the present case, the minimization method of determining the T-norm is used. In this case, it simply means selecting the minimum membership value from each non-zero "time since last passenger boarded" fuzzy set compared with every "size of last group" fuzzy set. This is described more fully with respect to an example, following the description of FIGS. 13 and 14, hereinafter.

Because of the overlapping fuzzy sets, it is possible in the present example set forth in FIGS. 1–12 to have one, two, three or four resulting target speeds determined from taking T-norms of each of one or two fuzzy sets of FIGS. 1–6 with each of one or two fuzzy sets of FIGS. 7–11. In order to resolve such results, a centroid method of defuzzification (rather than the max-membership method) is used. For instance, if the results of determining the T-norms include "set escalator speed to M" with a degree of belief of 0.3 "set escalator speed to S" with a degree of belief of 0.1, the resultant single target speed is determined by taking the normalized weighted sum of the recommended speeds, such as:

speed=(0.3M+0.1S)/(0.3+0.1)

where M=50% rated speed and S=30% rated speed the result is (15%+3%)/0.4=45.75%

Thus, speed is determined:

$$\text{SPEED} = \frac{\Sigma SPD(D,E) \times M(D) * M(E)}{\Sigma[M(D) * M(E)]} \quad (1)$$

where: SPD (D,E)=recommended speed for the "time" fuzzy set, D, combined with the "size" fuzzy set, E; M(D) is the membership value determined from fuzzy set D; M(E) is the membership value from fuzzy set E; and * denotes the T-norm operation (minimization).

The present invention utilizes the history of traffic on an escalator to alter the speed thereof for the purpose of saving energy, whenever traffic is light. The main precept of the present invention is to use fuzzy sets to express the history of traffic on the escalator in a way which combines the number of passengers in some prior period of time with a lapse of time related to when the last passenger boarded: either the time since the last passenger boarded the escalator (in one embodiment) or the time when the escalator first became empty (the last passenger exited, in another embodiment). Exemplary fuzzy sets are illustrated in FIGS. 1–11. In FIGS. 1–6, fuzzy sets indicative of the time since the last passenger boarded the escalator are shown. These fuzzy sets are provided with numbers, D=1 through D=6, so as to relate them to the processing which is described hereinafter with respect to FIGS. 13, 14 and 17. The fuzzy sets of FIGS. 7–11 are indicative of the size of the group, which in turn is defined as the maximum number of passengers on the escalator at any one time during either some fixed, prior cyclic or temporal interval, on the order of 5 minutes (in the first embodiment) or throughout the most recent operational interval of time that the escalator was not empty (in the second embodiment). In the fuzzy sets of FIGS. 1 through 6, the basis elements are time since the last passenger boarded, expressed in minutes, and the membership values are dimensionless, between zero and one. For instance, in FIG. 4, a basis element of 3 minutes will yield a membership value of about 0.6. Similarly, in the fuzzy sets of FIGS. 7–11, the basis elements are numbers of passengers and the membership values thereof are dimensionless, between zero and one. For instance, in FIG. 8, a basis element of 8 passengers will yield a membership value of about 0.8.

In the exemplary embodiments herein, the T-norm of the membership value of each of the fuzzy sets of FIGS. 1–6 and the membership value of each of the fuzzy sets of FIGS. 7–11 are determined, and the speed related to each of those T-norms is factored accordingly, and combined with the like factored speeds of other T-norms, so as to provide a speed command related to traffic history.

Figure 12:
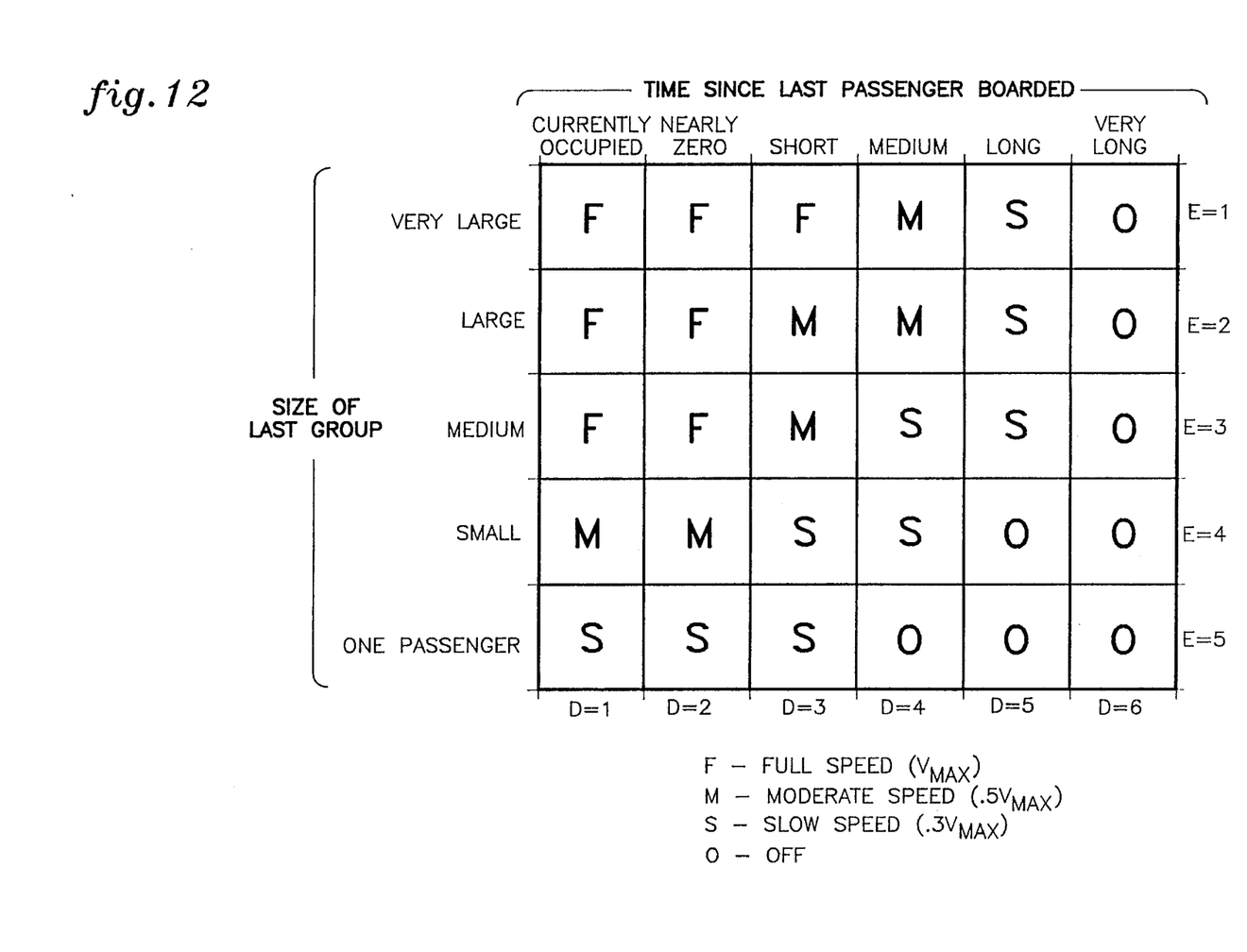
FIG. 12 is a chart illustrating target speeds related to T-norms of fuzzy sets of FIGS. 1–6 and fuzzy sets of FIGS. 7–11, in a first embodiment.

In FIG. 12, the rules for determining the target speed of the escalator, based upon traffic history, involve determining one or more recommended target speeds on the basis of the size of the last, maximum group of passengers on the escalator at one time during a recent operational, cyclic or temporal interval, along with the time since the last passenger boarded the escalator. An example of the rule is: if the size of the last group is small and the time since the last passenger boarded is medium, then set the escalator speed to slow (S). As described hereinafter, one of the advantages of using fuzzy sets which overlap each other (in the sense that four passengers will provide membership values from both the fuzzy set of FIG. 3 and the fuzzy set of FIG. 4 and by taking both into account, a result midway between small and medium may be achieved, all as described in detail hereinafter. Basically, this is achieved by determining the T-norm of the two fuzzy sets with each fuzzy set of FIGS. 5–11, which may be done by a variety of methods. In this embodiment, instead of "O" representing "off" or zero speed in FIG. 12, "O" may represent a slow, creep speed.

Because of the mechanical dynamics of the escalator, the target speed is not achieved instantaneously. For instance, it could take 10 seconds (on the order of ½ of a run) to go from standstill to rated speed; it could take 6 seconds to go from half speed to full speed; it could take two seconds to go from 90% of rated speed to full speed. This depends on the given escalator installation, and may be determined empirically (if desired, for any reason) in any case. However, it is not important to the invention only in setting parameter details to achieve a desired balance between passenger accommodation and energy saving. Similarly, target speeds below actual speed will take time to be reached.

A first embodiment of the present invention, sets the speed to a value bearing a relationship to traffic on the escalator, which is measured by the time since the last passenger boarded and the maximum number of passengers at any time during a recent period of about five minutes (for example). In the exemplary embodiments herein, for simplicity, it is assumed that the speed calculations will be done once for each exchange of a step on the escalator; escalator steps are referred to herein as "treads". That is, once for each time that a new tread (step) appears which could, but may not, hold an additional passenger. Also for simplicity, it is assumed that the escalator of this embodiment is one which is designed to hold a single passenger per tread, although the embodiment will be shown to be extendable to cover systems designed to handle more than one passenger per tread. For simplicity in explaining a single working embodiment, it is assumed that the escalator has a rise of fifteen feet, with a nine inch rise between treads, thereby providing twenty treads for passenger use at any one time. Since the data only changes each time that a new tread appears and a passenger either does, or does not enter onto the new tread, all of the calculations can be done on a per tread basis, in this simplest of embodiments. However, other embodiments may use a passenger entry interrupt, or some other scheme as the basis for performing new calculations, with interim updates of the calculations based upon time alone. None of this is significant to the use of the invention, as should be apparent from the description which follows.

In this embodiment, it is assumed that the speed determination routine is based upon the appearance of a tread at the boarding end of the escalator, which by means of a simple sensing mechanism on the escalator will signal the computer that another tread has reached a particular position with respect to the escalator as a whole. A signal from that sensor will cause a tread interrupt, which reaches the routine of FIG. 13 through a tread interrupt entry point 9, and a first program step increments a T counter which is used to separately identify the various treads currently capable of carrying passengers. Each actual tread will of course be associated with some different T number each time that it appears (unless the escalator happens to have an even multiple of the number of available treads, which is highly unlikely). The T counter, when incremented, will advance through its highest count and thence back to its lowest count; for twenty treads, the S counter is modulo twenty. Then, a step 11 initiates a passenger count for tread T to zero. A test 12 determines if a boarding sensor light beam (not shown) is broken, or not. If it is, this means that there is a passenger on the new tread T, and so a step 13 sets the passenger count for tread T equal to one. A weight or other sensor could be used. In an embodiment of the invention for an escalator designed to handle more than one passenger per tread, the test 12 may be eliminated, and the step 13 may set the passenger count for tread T equal to whatever that count is (0,1,2 . . . ) from any sort of known people counter. A step 14 sets a value, LAST BORDED, which keeps track of the time since the last passenger boarded the escalator, equal to the current time, TIM. If no one entered the escalator as tread T appeared, steps 13 and 14 are bypassed.

Figure 13:
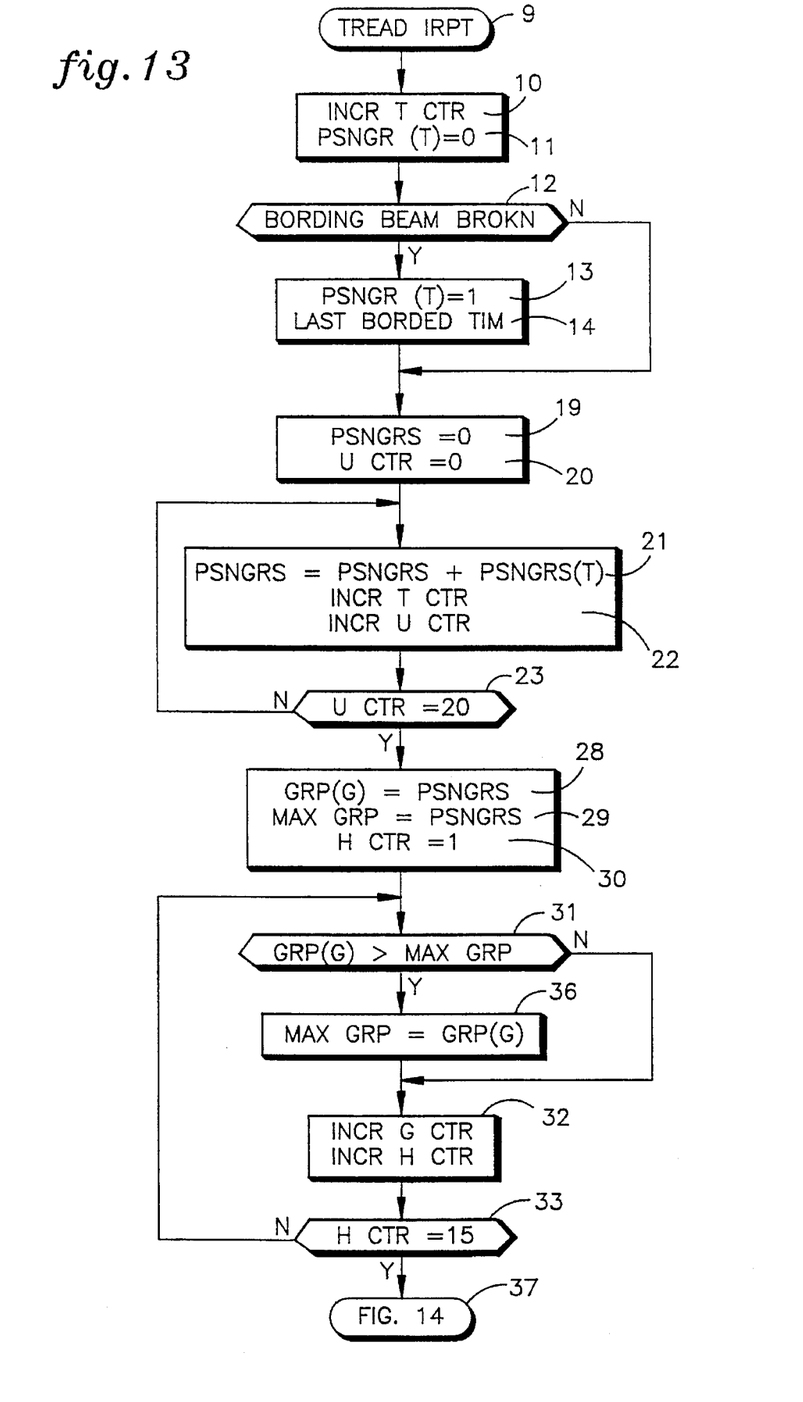
FIGS. 13 and 14 are a logic flow diagram of a routine for performing a first embodiment of the present invention.

A step 19 sets a total passenger count, PSNGRS, equal to zero, and a step 20 sets a U counter equal to zero; the U counter is used to count through all the currently-exposed treads of the escalator, as described below. Then, a step 21 causes the passenger count to be incremented by the number of passengers which was most recently sensed for tread T. Initially, this is the new tread which has just had its count set in step 13. Then the T and U counters are incremented in a pair of steps 22 and a test 23 determines if all the treads have had their passenger counts added yet or not. If not, the program steps 21 and 22 are repeated. When the U counter reaches 20, the T counter will have advanced, module 20 (in this case), back to the count it had in step 11.

When the counts of passengers on all of the twenty current treads have been added into the passenger count, an affirmative result of the test 23 reaches a step 28 in which the number of passengers in the group of passengers presently on the escalator, G, is set equal to the number of passengers determined in the step 21. In this embodiment, for instance, there may be a set of fifteen groups, comprising nearly three groups per minute across a span of almost five minutes, from which it can be determined the maximum number of passengers in any group during about the last five minute period. After about five minutes, the oldest group drops off and a new group, G, is added into the set of groups. A step 29 also sets a factor identified as the maximum group, which ultimately will contain the number of passengers in the group having the maximum number of passengers, equal to the number of passengers determined in the step 21. Then, an H counter, which is used locally to process all G groups, is set equal to one. A test 31 determines if the number of passengers in group G is greater than the number of passengers in the maximum group. Initially, they are identical, and a negative result of test 31 reaches a pair of steps 32 where the G counter and the H counter are incremented, and a test 33 which determines if the H counter has reached fifteen (thereby indicating having interrogated all of the groups) or not. Initially, it will not have, so a negative result of test 33 causes the routine to revert to the test 31 to see if the next group is larger than the heretofore-determined maximum group. If it is, an affirmative result of test 31 reaches a step 36 to reestablish the size of the maximum group as that of the size of group G. When all of the groups have been compared so that the largest one is established as the maximum group in the last performance of the step 36, the G counter will be incremented to a count one greater than the count it had before step 28, thereby to point to what was the oldest group in the set, so it will become the newest group in the set after the next tread appears, in the next pass through FIG. 13. The H counter will have been incremented to fifteen, whereby an affirmative result of test 33 causes the program to advance to FIG. 14 through a transfer point 37.

As an example, assume that during one tread interrupt, the time since the last passenger boarded is three minutes, and the size of last group is eight passengers. In traditional fuzzy arithmetic, each basis element of time is used as the argument to determine corresponding membership values (degrees of membership) from all fuzzy sets in FIGS. 1–6 and provide a "time" fuzzy set having basis elements equal to the degree of the related fuzzy set of FIGS. 1–6, and membership values determined therefrom, which might be as follows in the foregoing example:

$$FO(time)=\{0.01CO, 0.01NZ, 0.01S, 0.61M, 0.51L, 0.01VL\}$$

where: CO=Currently occupied; NZ=nearly zero; S=Short; L=Long; and VL=Very Long.

Similarly, a "size" fuzzy set extracted from FIGS. 7–11, in the foregoing example, would be:

$$FO(size)=\{0.01OP, 0.81S, 0.31M, 0.61L, 0.01VL\}$$

where: OP=one passenger; S=small, M=medium; L=large; and VL=very large.

Then, the target speed is computed using the T-norm operator to identify the membership associated with each possible outcome, as illustrated in FIG. 12. When using the min/max method, the T-norm operator is simply the minimum, MIN, of the membership, M, of each pair MIN [M(D), M(E)] as described hereinafter. Each pair (D,E) is associated with a recommended target speed, such as the examples of FIG. 12. If only one T-norm were non-zero, the target speed would be the speed associated therewith: e.g., SPD(4,2)=0.5 Vmax. But, most basis elements will yield more than one non-zero T-norm in the examples of FIGS. 1–11, so each T-norm is used to provide a weighted average of recommended speeds (from FIG. 12), as described more fully hereinafter.

Figure 14:
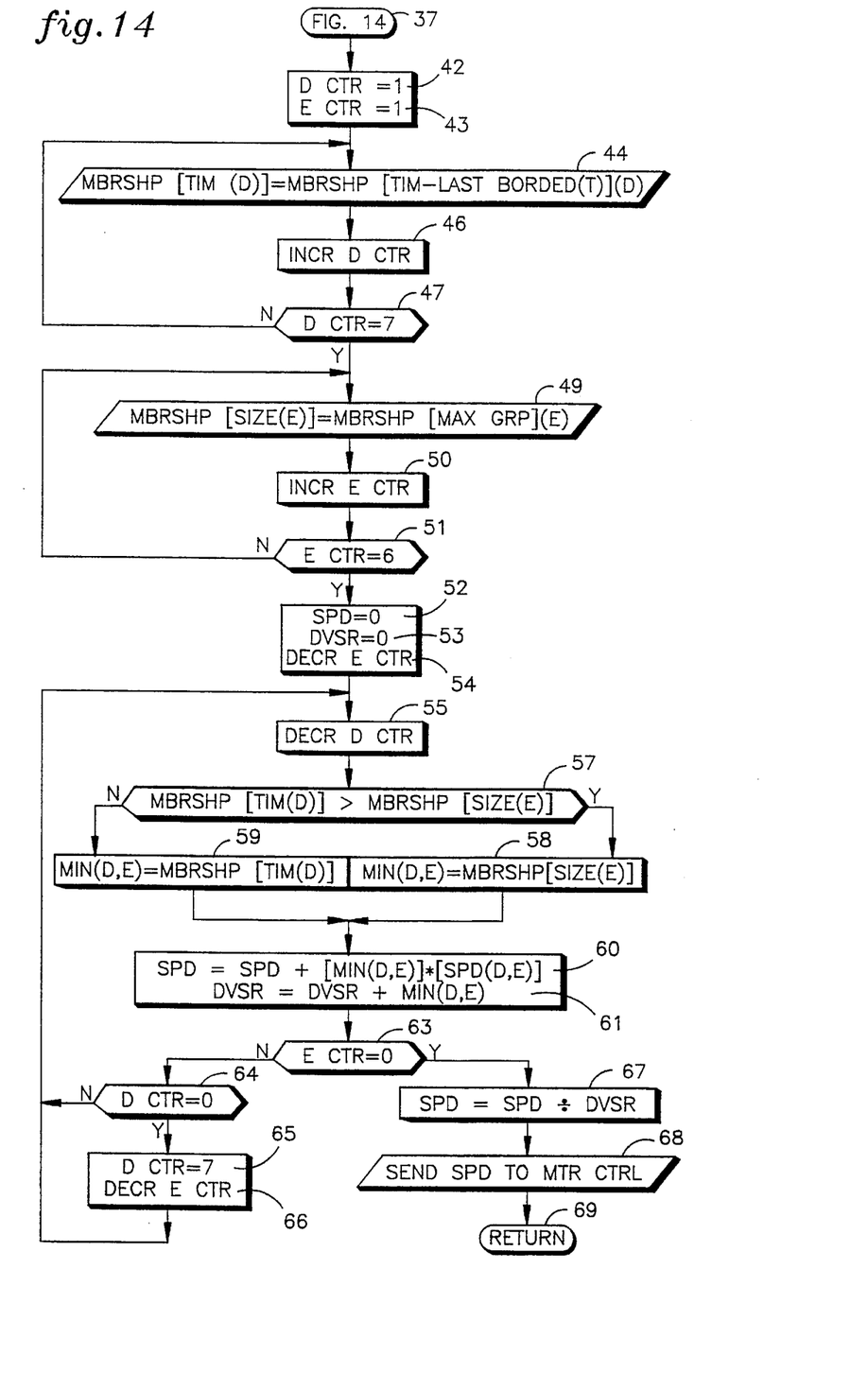

In FIG. 14, a first step 42 sets an D counter equal to one and a step 43 sets an E counter equal to 1. These counters are used to help keep track of the use of the information derived from the various fuzzy sets which are numbered from D1 through D6, in FIGS. 1–6 and E1 through E5 in FIGS. 7–11, in the processing which follows, and in an example of possible actual numbers which is presented hereinafter.

Then a subroutine 44 uses the "LAST BORDED" to determine the likelihood of the elapsed time since the last passenger boarded the escalator being deemed to be any of the conditions of FIGS. 1–6: currently occupied; nearly zero; short; medium; long; or very long. It does this by looking up in fuzzy set D (initially, the "currently occupied" fuzzy set of FIG. 1) the membership value of a basis element equal to the time which has elapsed since the time when the last passenger boarded, set in step 14 of FIG. 13. Then the D counter is incremented in a step 46 and the membership value of the basis element for the elapsed time since the last passenger boarded onto the escalator, is looked up in the next fuzzy set, NEARLY ZERO. Again, the D counter is incremented in the step 46 and a test 47 determines if all of the "time since last passenger boarded" fuzzy sets of FIGS. 1–6 have been interrogated or not. If so, the D counter is set to six and an affirmative result of test 47 will reach a subroutine 49 to determine the likelihood of the last maximum group (step 36, FIG. 13) being deemed to be any of the conditions of FIGS. 7–11: one passenger; small; medium; large; or very large. A membership value for a basis element equal to the maximum group is looked up in fuzzy set E (initially E=1, which is the fuzzy set "VERY LARGE", of FIG. 7). Then the E counter is incremented in a step 50, and a test 51 determines if the membership values of all of the "size of last group" fuzzy sets have been looked up or not. Initially, they will not have, and a negative result of test 51 reverts the program to the subroutine 49 to look up the membership value of the maximum group (determined in the last step 36) in the next fuzzy set, in this case the fuzzy set E=2, "LARGE", FIG. 8. When the membership value of the maximum group has been looked up in all five "size of last group" fuzzy sets, an affirmative result of test 51 will reach a step 52 which initializes a desired speed value, SPD, to zero; a step 53 which initializes a divisor, DVSR, to zero; and a step 54 which decrements the E counter so it will point to the highest numbered "size of last group" fuzzy set, FIG. 11.

As described hereinbefore, the min/max method of determining T-norm for each combination of fuzzy sets simply requires determining the minimum membership value between each of the "time since last passenger boarded" fuzzy sets and each of the "size of last group" fuzzy sets. Commencing with the values of D (7 in this instance) and E (5 in this instance) which have been left by the steps 46 and 54, and decrementing through all of the fuzzy sets, D, vs. each of the fuzzy sets, E, all of the values for the present example of equation (1) can be determined, along with the divisor needed to normalize the value, and thus have it in terms of percent of rated speed.

Figure 1:
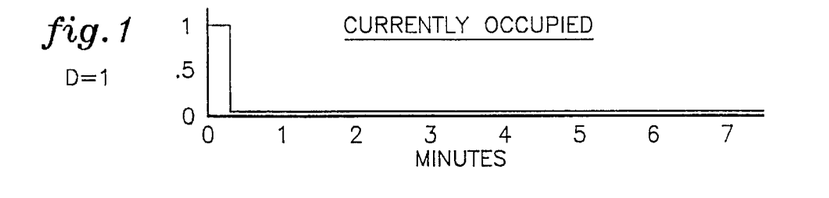
FIGS. 1–6 illustrate fuzzy sets representing elapsed time related to the last passenger boarding the escalator.
Figure 2:
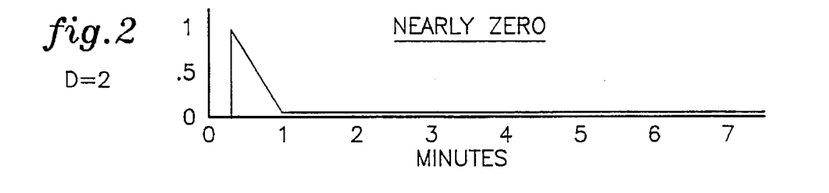
Figure 3:
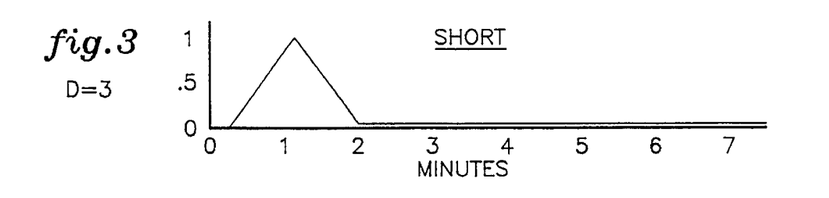
Figure 4:
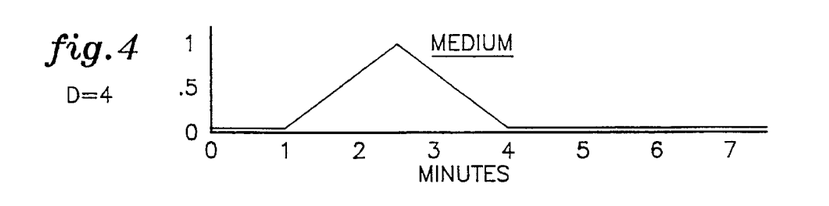
Figure 5:
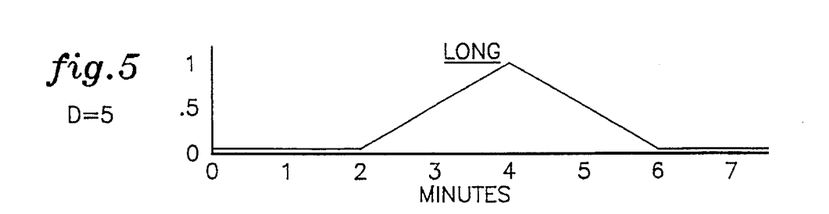
Figure 6:
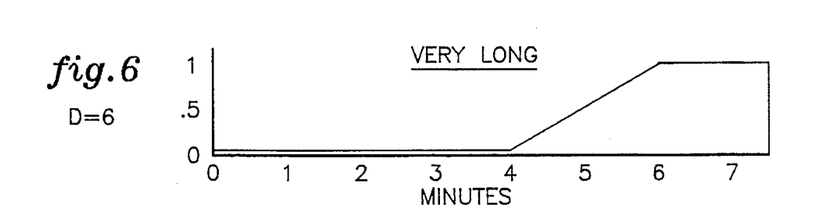
Figure 7:
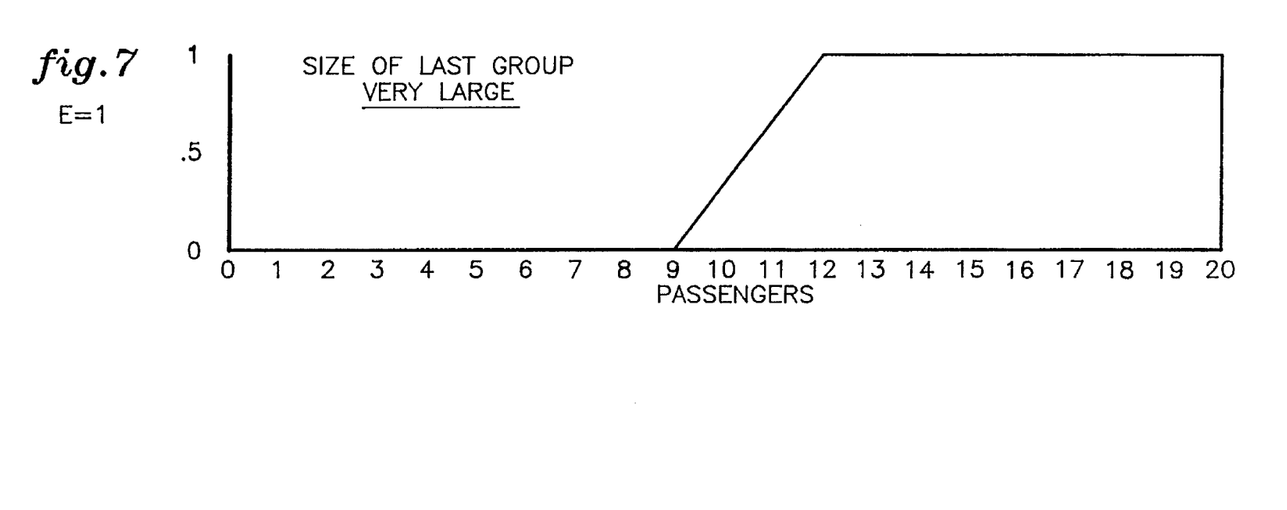
FIGS. 7–11 illustrate fuzzy sets representing the size of groups of passengers on the escalator at one time.
Figure 8:
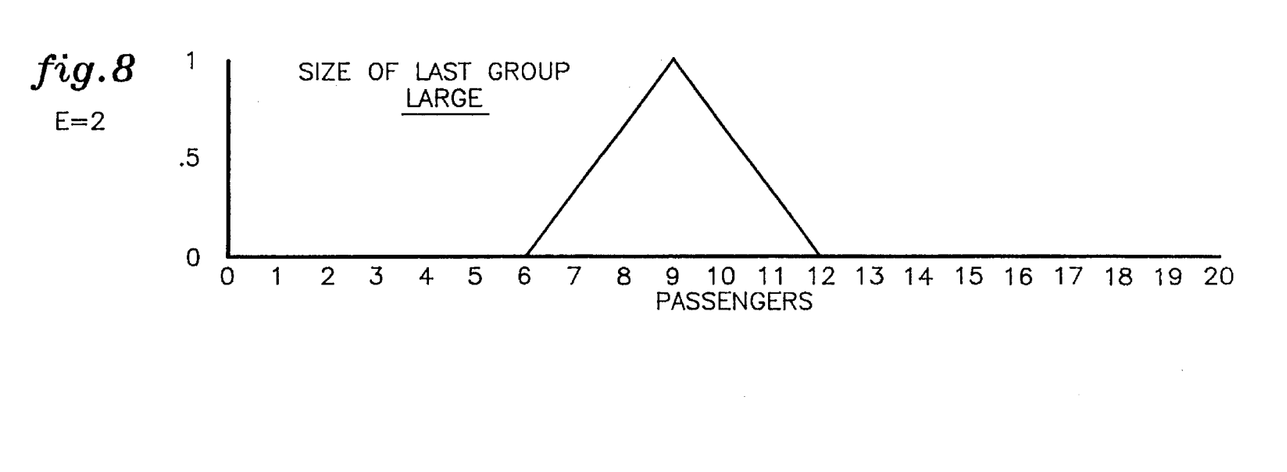
Figure 9:
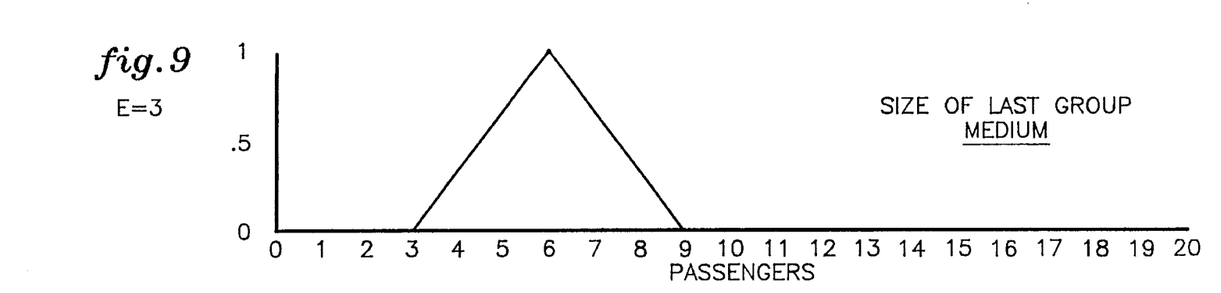
Figure 10:
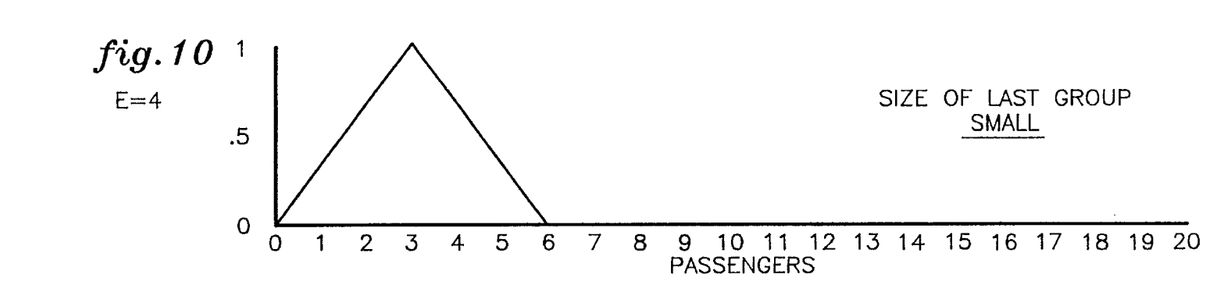
Figure 11:
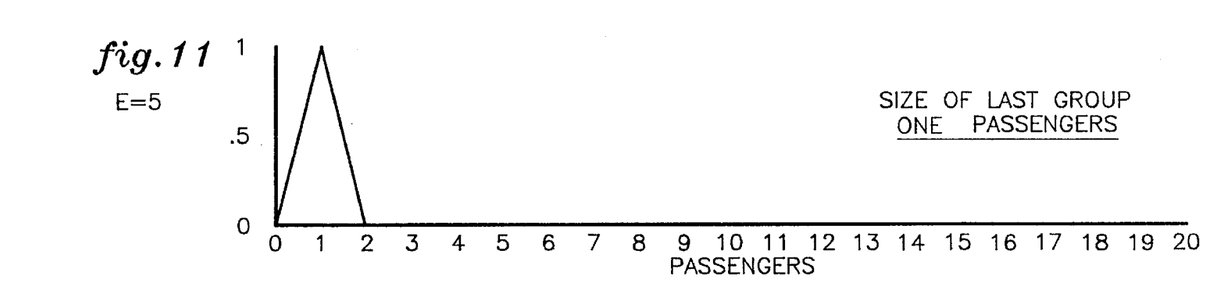

Specifically, a step 55 decrements the D counter so it will point to the highest numbered "time since last passenger boarded" fuzzy set, FIG. 6. Then, a test 57 determines if the membership value determined for the fuzzy set D is greater than the membership value determined for the fuzzy set E, initially for D=6 and E=5. This then is comparing the membership values of "very long" and "one passenger" (see FIG. 12) so as to determine the T-norm of these two sets. If the membership value of D is greater than the membership value of E, an affirmative result of test 57 reaches a step 58 in which the minimum degree of the fuzzy sets D=6 and E=5 is set equal to the membership value of E=5. On the other hand, if the membership value of D is less than the membership value of E, a negative result of test 57 reaches a step 59 in which the minimum degree of the fuzzy sets D=6 and E=5 is set equal to the membership value of the fuzzy set D=6. Then, a step 60 increments the speed value by adding to it the minimum membership amongst the two fuzzy sets D=6 and E=5 multiplied by the speed corresponding to those two sets, in this case the speed is "off", or zero, as illustrated in the chart of FIG. 12. And, in a step 61, the divisor has added to it the minimum membership between the two fuzzy sets D=6 and E=5. A test 63 determines if E has been decremented to zero; initially it will not have been, so a negative result of test 63 reaches a test 64 to see if the D counter has been decremented to zero, or not. In this first pass, it has been decremented only back to 6, so a negative result of test 64 causes the program to revert to step 55 where the D counter is decremented so that the T-norm for the fuzzy set "large" (D=5) and the fuzzy set "one passenger" (E=5) can be determined. Then the test 57 determines the minimum between the fuzzy set D=5 and the fuzzy set E=5. In this way, the T-norm is found for the combination of the fuzzy set E=5 and all of the fuzzy sets D=6 through D=1. Eventually, the D counter will be decremented to zero, so an affirmative result of test 64 will reach a step 65 where the D counter is restored to a value of 7, and a step 66 which decrements the E counter. And now, the T-norm can be determined for the fuzzy set E = 4 with respect to each of the fuzzy sets D=6 through D=1, in the same fashion. When processing is complete for all combinations of fuzzy sets, the E counter will have been decremented to zero and an affirmative result of test 63 will reach a step 67 in which speed is calculated as the total of all speed values determined in all of the processing of the steps and tests 52–66 divided by the aggregate of divisors determined in those steps, thereby replicating equation (1). And then, a subroutine 68 sends the speed to the escalator motor driver to act as a speed command, thereby controlling the actual speed of the escalator. Other parts of programming are then reverted to through a return point 69.

In the previous example, steps and tests 44–47 will provide non-zero membership values from the fuzzy sets D=4 (0.6) and D=5 (0.5), and not from the remaining fuzzy sets D=1, D=2, D=3, and D=6. Similarly, the steps and tests 52–54 will yield nonzero membership values for the fuzzy sets E=2 (0.8) and E=3 (0.3), and zero valued membership values from the fuzzy sets E=1, E=4, and E=5. If the fuzzy sets were designed with greater overlap from adjacent fuzzy sets of like kind, then more non-zero results could occur in many cases. However, because of the manner in which the minimums are selected and then added to each other and normalized (in steps and tests 52–67), it is immaterial how many T-norms (how many minimums between pairs of fuzzy sets) are actually involved in the calculation of the speed command. In this case, the speed command will be calculated as:

MIN [D=4, E=2 ]=MIN[0.6, 0.8]=0.6
MIN [D=4, E=3 ]=MIN[0.6, 0.3]=0.3
MIN [D=5, E=2 ]=MIN[0.5, 0.8]=0.5
MIN [D=5, E=3 ]=MIN[0.5, 0.3]=0.3

From FIG. 12:

SPD [D=4, E=2]=M=0.5 Vmax
SPD [D=4, E=3]=S=0.3 Vmax
SPD [D=5, E=2]=S=0.3 Vmax
SPD [D=5, E=3]=S=0.3 Vmax Combining, as in steps and tests 57–67:

$$\frac{(0.6 \times 0.5 \text{ Vmax}) + (0.3 \times 0.3 \text{ Vmax}) + (0.5 \times 0.3 \text{ Vmax}) + (0.3 \times 0.3 \text{ Vmax})}{0.6 + 0.3 + 0.5 + 0.3} = \frac{.63 \text{ Vmax}}{1.7} = .37 \text{ Vmax}$$

Thus, it can be seen that a value of commanded speed which is different from any of the four values illustrated in FIG. 12 may result. In fact, because of the methodology utilized, particularly in steps and tests 52–67, ten or more basic speeds may be utilized, instead of the four illustrated in FIG. 12, with no change in the processing. This is one of the advantages of the present invention: it allows a great deal of flexibility with little change in programming.

Figure 15:
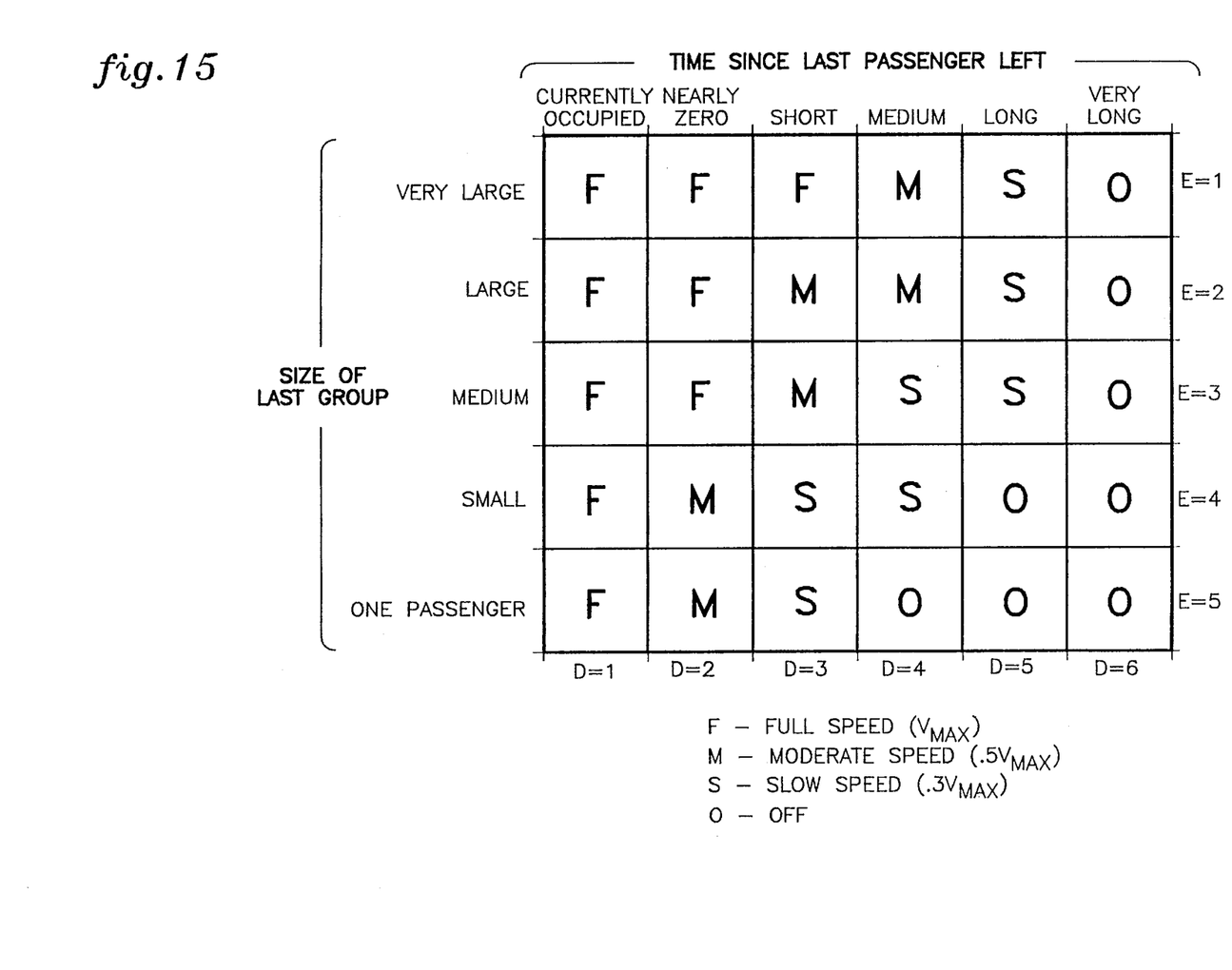
FIG. 15 is a chart illustrating target speeds related to T-norms of fuzzy sets of FIGS. 1–6 and fuzzy sets of FIGS. 7–11, in a second embodiment.

In a second embodiment of the invention, a completely different control concept is utilized. Instead of matching the speed to the traffic, the control concept of this embodiment dictates a target speed of full speed (Vmax) when there is even one passenger on the escalator as shown in FIG. 15, and may provide a target speed of either zero (in one implementation of this embodiment) or a creep speed (in another implementation of this embodiment) whenever there are no passengers on the escalator. However, the variable speed, selected essentially as described with respect to the first embodiment in FIGS. 13 and 14, is utilized so as to soften the effects, and thereby mitigate the costs, of having to restart the escalator after shutting it off for lack of passengers, prior to the escalator having been shut down for a sufficient length of time to overcome the costs of startup. In this control scheme, when there is any passenger on the escalator, the target speed is full speed; when there is no passenger on the escalator, the target speed, within any speed control cycle (such as the 20 millisecond, per tread cycles of the first embodiment) is determined by the history of traffic. Thus, the target speed for an empty escalator which has heretofore had recent, heavy traffic might be the medium speed whereas if the escalator had no recent heavy traffic, the target speed might be fully stopped (or creep speed).

The differences in processing in this embodiment over the prior embodiment, in addition to the particular numbers which might be used, include: first, that the target speed is always full speed if there is any passenger on the escalator as shown in the first column of FIG. 15; second, that the size of the last group in a recent interval is determined as the maximum number of passengers on the escalator at any one time during the previous period of continuous non-empty operation; and third, instead of the elapsed time related to the last passenger boarding being "time since last passenger boarded", "time since last passenger which boarded has exited" basis elements are used as arguments for the fuzzy sets of FIGS. 7–11 (even through FIGS. 7–11 are not renamed for this second embodiment). Thus, the determination of the maximum number of passengers is continued from the point that any one passenger boards the escalator until the escalator is totally empty, the elapsed time is time since the escalator became empty, and processing (other than counting each group) is performed only when empty.

Figure 16:
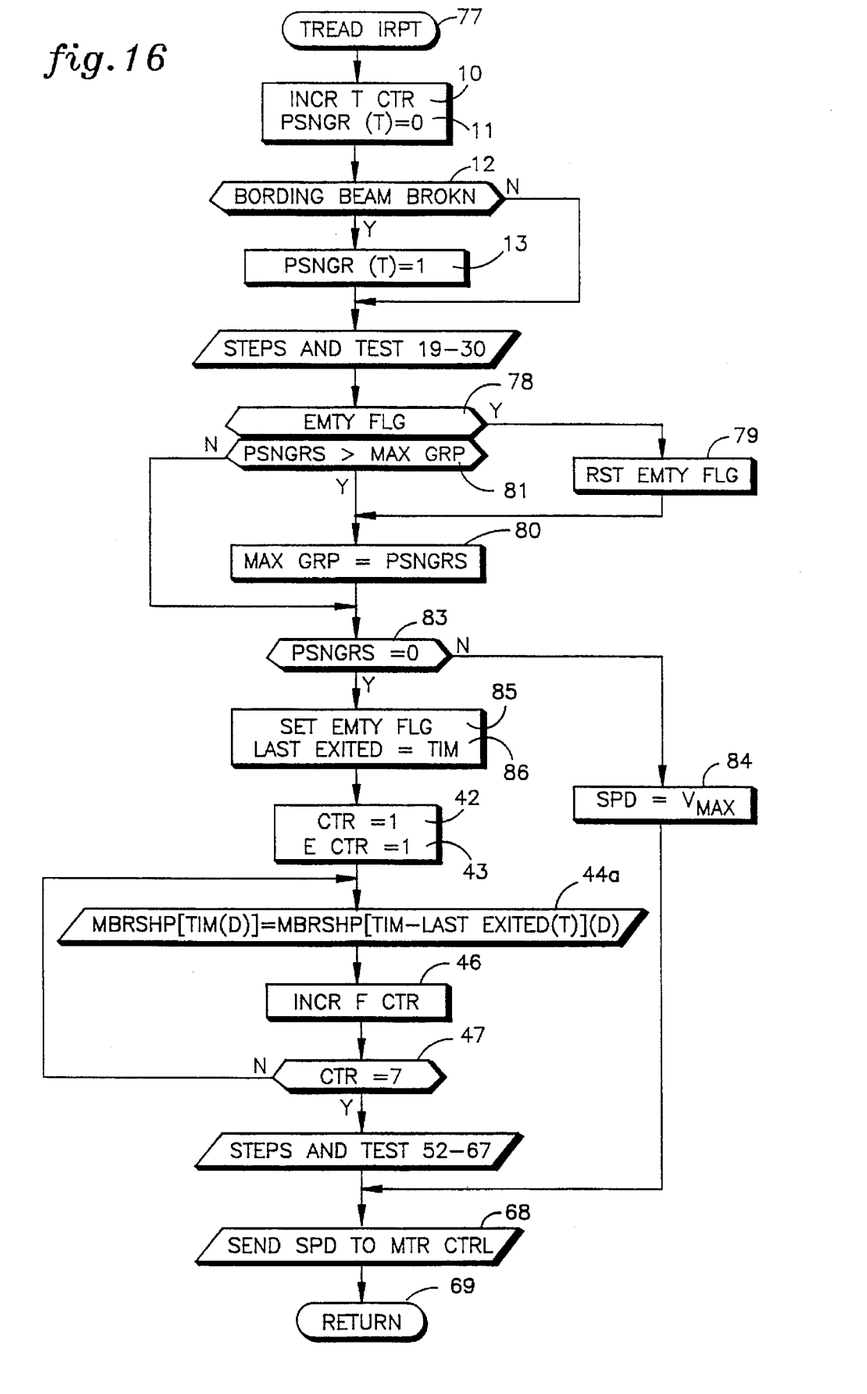
FIG. 16 is a logic flow diagram of a routine for performing a second embodiment of the present invention.

Referring now to FIG. 16, a routine for performing the second embodiment of the invention is reached through an entry point 77. The new passenger steps and tests 10–13 of FIG. 13 are performed in the same fashion. The difference being that step 14, to record the time the last passenger boarded, is not used in the embodiment of FIG. 16. Instead, this embodiment uses a time related thereto by the movement of the escalator: the time when this passenger exits, as described hereinafter. Then, the steps and tests 19–30, which determine the number of passengers in the group now on the escalator, are performed in the same fashion as described hereinbefore with respect to FIG. 13. However, the steps and tests 31–36 of FIG. 13, which determine the maximum group in the last five minutes (or so) period of FIG. 13 are not utilized in the embodiment of FIG. 16. Instead, as is described more fully hereinafter, an empty flag is interrogated in a step 78 to determine if the next prior tread interrupt had determined that the entire escalator was empty.

If the entire escalator was empty the last time the routine of FIG. 16 was run, the empty flag is reset in a step 79 and the maximum group is taken to be however many are currently on the escalator by setting maximum group equal to the passengers count of step 21 (FIG. 13) in a step 80. If, however, the escalator was not empty during the next prior running of the routine of FIG. 16 then a test 81 determines if the number of passengers currently on the escalator is greater than the maximum number which was previously determined. If it is, then the maximum group is set equal to the current number of passengers in the step 80. But if not, then the step 80 is bypassed.

A major difference in the two embodiments is the determination of whether the escalator is empty, at a test 83. If it is not, a negative result of test 83 causes the program to advance to a step 84 where the target speed is set equal to Vmax, without any of the processing of FIG. 14. Then, the speed command is sent to the motor controller in the subroutine 68 and other processing is reverted to through the return point 69. In the case where there are passengers on the escalator, as just described, the only functions are to keep track of the number of passengers on the escalator, and to update the maximum group (when appropriate).

If there is no passenger on the escalator, an affirmative result of the test 83 reaches a step 85 which sets the empty flag, described hereinbefore, so that the size of the maximum group can be reinitialized in the next following pass through the routine of FIG. 16, as just described. Then, a test 86 sets a "last exited" factor equal to the current time; this is the factor utilized in place of "time since last passenger boarded" as an argument for FIGS. 1–6. Then, steps 42 and 43 are performed in the same fashion as in the embodiment of FIG. 14 to initialize the counters for looking up membership values in the fuzzy sets. A subroutine 44a determines the membership value in the fuzzy set "currently occupied", FIG. 1, utilizing the time since the last passenger left the empty escalator as determined by current time minus the "last exited" time set in step 86. This is the same as the subroutine 44 of FIG. 14 except that time since last passenger exited is utilized instead of time the last passenger boarded. Then, the steps 46 and 47 cause each of the fuzzy sets of FIGS. 2–6 to have the membership values determined in the subroutine 44a as in FIG. 16, but utilizing time since the last passenger exited. Then, the steps 52–67 are performed in the same fashion as is described hereinbefore with respect to FIG. 14. In other words, when the escalator is empty, the fuzzy processing (essentially that of FIG. 14) is performed to determine the command speed of the escalator, based upon traffic history, so as to bring it toward or to rest (or a creep speed) in a fashion which reflects the likelihood that it will reach rest (or a creep speed).

The second embodiment of the invention described with respect to FIG. 16 utilizes the four basic speeds of the first embodiment, including zero speed or rest, as shown in FIG. 15. However, a second implementation of that embodiment may use a creep speed which is defined as the speed at which the escalator can run efficiently (without undue jerk, drag or other energy consuming effects) to take advantage of the fact that the bulk of the energy required to start up an escalator which is at rest is involved in overcoming static friction; the use of a suitable creep speed retains the escalator in a condition of energy conserving dynamic friction. Thus, the term "minimum speed" herein encompasses both zero speed and a very low, creep speed which may be used in place of zero speed, depending upon the implementation of the second embodiment of the invention. The selected number of passengers in the embodiments of FIGS. 13, 14 and 16 is the maximum number of passengers during the related interval; however, a different selected number, such as a weighted average, or otherwise, may be used.

The various details of implementation herein are not important to the practice of the invention. For instance, there may be more or fewer of each type of fuzzy set in FIGS. 1–6 and in FIGS. 7–11. The detailed membership values in the fuzzy sets may be altered. The charts of FIGS. 12 and 15 may differ. The number of base speeds used may be other than four, as described hereinbefore. The detailed programming routines herein are illustrative of functions, and not necessarily of the manner in which the invention should be practiced (different shapes and different relationships to each other).

The nature of the fuzzy sets will of course be determined in part on the expected traffic patterns for the escalator in question. For instance, in a building having very low traffic, the "very long" fuzzy set of FIG. 6 may begin at three minutes, rather than at four minutes, as shown. Similarly, in an extremely low traffic building, the size of "last group very large" fuzzy set of FIG. 7 might begin at four passengers, rather than nine passengers. The converse would be true for very heavy traffic. Thus, in one embodiment of the invention, the escalator may be allowed to slow down more often or less often for a given traffic pattern, as is deemed most appropriate for the given utilization of the invention, and in the other embodiment of the invention, the escalator may have target speeds tending to slow it down more quickly or tending to slow it down less quickly, when it is empty, by virtue of tailoring of the fuzzy sets.

The fuzzy set membership values may be calculated (rather than being looked up in tables) in a well-known fashion, from arithmetic expressions of the fuzzy sets:

Time since last passenger boarded:
Currently Occupied=$\{[1.0,0], [1.0,.3], [0.0,.3]$
Nearly zero=$\{[0.0,0], [0.0,.3], [1.0,.3], [0.0,1]$
Short=$\{[0.0,0], [0.0,.3], [1.0,1.2], [0.0,2]\}$
Medium=$\{[0.0,0], [0.0,1], [1.0,2.5], [0.0,4]\}$
Long=$\{[0.0,0], [0.0,2], [1.0,4], [0.0,6]\}$
Very Long=$\{[0.0,0], [0.0,4], [1.0,6]\}$ Size of Last Group
Very Large=$\{[0.0,0], [0.0,9], [1.0,12]\}$
Large=$\{[0.0,0], [0.0,6], [1.0,9], [0.0,12]\}$
Medium=$\{[0.0,0], [0.0,3], [1.0,6], [0.0,9]\}$
Small=$\{[0.0,0], [1.0,3], [0.0,6]\}$
One passenger=$\{[0.0,0], [1.0,1], [0.0,2]\}$ Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A method of controlling the speed of a variable speed escalator having a motor controller and having a passenger sensor for providing signals indicative of the number of passengers boarding the escalator, according to a control concept related to recent history of traffic on said escalator, comprising:

sensing the presence of passengers as passengers board said escalator and providing passenger signals indicative thereof;

in response to said passenger signals, providing a time signal representing a period of elapsed time, related to the last passenger boarding said escalator, indicative in said control concept of the level of traffic on said escalator;

providing in response to said passenger signals a group signal representing a selected number of passengers indicative in said control concept of the level of traffic on said escalator;

providing a group of first fuzzy sets, each of said first fuzzy sets relating to the degree to which said period of elapsed time represents a significant lapse of time in said control concept, each fuzzy set including a plurality of predetermined first sets of signals, each of said first sets of signals relating to a given period of elapsed time, each of said first sets of signals having signals corresponding to a plurality of terms, each term including a basis element equaling a given period of elapsed time and a corresponding membership value indicative of the extent to which the related period of elapsed time represents a significant lapse of time in said control concept to the degree represented by the corresponding fuzzy set;

providing a group of second fuzzy sets, each of said second fuzzy sets relating to the degree to which said selected number of passengers constitutes significant traffic in said control concept, each fuzzy set including a plurality of predetermined second sets of signals, each of said second sets of signals relating to a number of passengers, each of said second sets of signals having signals corresponding to a plurality of second terms, each of said second terms including a basis element equaling a number of passengers and a corresponding membership value indicative of the extent to which said number of passengers constitutes a significant number of passengers in said control concept to the degree represented by the corresponding fuzzy set;

providing, from said first fuzzy sets, in response to said time signal, a plurality of signals indicative of a time fuzzy set in which each term has a basis element indicative of the degree to which said elapsed time is determined to be a significant lapse of time in said control concept corresponding to one of said first fuzzy sets and a membership value equal to the membership value of the related first fuzzy set;

providing, from said second fuzzy sets, in response to said group signal, a plurality of signals indicative of a size fuzzy set in which each term has a basis element equaling the degree to which said selected number of passengers represents a significant number of passengers in said control concept corresponding to one of said second fuzzy sets and a membership value equal to the membership value of the related second fuzzy set; and providing a target speed command to said motor controller based on said time fuzzy set and said size fuzzy set.

2. A method according to claim 1 including:

providing a predetermined set of speed signals, each representing an escalator speed to which a corresponding combination of the condition represented by each of said first fuzzy sets with each of said second fuzzy sets relates in said control concept; and providing said target speed command based on the summation of the products of said membership values and the corresponding ones, respectively, of said speed signals.

3. A method according to claim 1 including the step of:

in response to said passenger signals, successively providing total passenger signals indicative of the total number of passengers on said escalator at any one time; and providing said group signal in response to said total passenger signals.

4. A method according to claim 1 wherein said time signal represents the time since the last passenger boarded said escalator and said group signal represents a selected number of passengers on said escalator at any one time during a recent interval of time.

5. A method according to claim 1 wherein said speed signals represent escalator speeds inclusively between rated speed and fully stopped speed.

6. A method according to claim 1 wherein said speed signals represent escalator speeds inclusively between rated speed and a low creep speed.

7. A method according to claim 1 wherein said time signal represents the time since the last passenger exited said escalator and said group signal represents a selected number of passengers on said escalator at any one time since the last time said escalator was empty.

8. A method according to claim 1 wherein said selected number of passengers is the maximum number of passengers on said escalator at any one time during a determinable interval.

9. A method according to claim 4 wherein said selected number of passengers is the maximum number of passengers on said escalator at any one time during said interval.

10. A method according to claim 4 wherein said interval is defined by a predetermined number of escalator treads appearing for passengers to board.

11. A method according to claim 9 wherein said selected number of passengers is the maximum number of passengers on said escalator at any one time since the last time said escalator was empty.

12. A method of controlling the speed of a variable speed escalator having a motor controller and having a passenger sensor for providing signals indicative of the number of passengers boarding the escalator, according to a control concept related to recent history of traffic on said escalator, comprising:

sensing the presence of passengers as passengers board said escalator and providing passenger signals indicative thereof;

in response to said passenger signals, providing a time signal representing a period of elapsed time, related to the last passenger boarding said escalator, indicative in said control concept of the level of traffic on said escalator;

and providing a speed command signal to said motor controller in response to the level of traffic indicated by said time signal and said passenger signals, thereby to cause said escalator to operate at a speed related to the level of traffic thereon.

13. A method according to claim 12 including the steps of:

in response to said passenger signals, successively providing total passenger signals indicative of the total number of passengers on said escalator at any one time;

providing time fuzzy sets and passenger fuzzy sets respectively indicative of the degree to which said period of elapsed time and said number of passengers on said escalator at any one time indicate traffic level in said control concept; and providing said speed command using fuzzy arithmetic to combine membership values of said time fuzzy sets and said passenger fuzzy sets determined from said time signal and said total passenger signals.

14. A method of controlling the speed of a variable speed escalator having a motor controller and having a passenger sensor for providing signals indicative of the number of passengers boarding the escalator, according to a control concept related to recent history of traffic on said escalator, comprising:

sensing the presence of passengers as passengers board said escalator and providing passenger signals indicative thereof;

in response to said passenger signals, providing a time signal representing a period of elapsed time, related to the last passenger boarding said escalator, indicative in said control concept of the level of traffic on said escalator;

in response to said passenger signals, successively providing total passenger signals indicative of the total number of passengers on said escalator at any one time;

in response to said total passenger signal indicating that said escalator is not empty, providing a speed command signal to said motor controller to cause said motor controller to operate at its maximum operating speed; and in response to said total passenger signal indicating that said elevator is empty, providing a speed command signal to said motor controller to cause said motor controller to operate at a speed below said maximum operating speed which is a function of said time signal and said total passenger signal.

15. A method according to claim 14 including the steps of:

in response to said passenger signals, successively providing total passenger signals indicative of the total number of passengers on said escalator at any one time;

providing time fuzzy sets and passenger fuzzy sets respectively indicative of the degree to which said period of elapsed time and said number of passengers on said escalator at any one time indicate traffic level in said speed control concept; and providing said speed command using fuzzy arithmetic to combine membership values of said time fuzzy sets and said passenger fuzzy sets determined from said time signal and said total passenger signals.

16. A method according to claim 14 wherein said speed command signal may cause said motor controller to stop said escalator when said escalator has had no passengers for a significant period of time.

17. A method according to claim 14 wherein said speed command signal may cause said motor controller to operate said escalator at a low creep speed when said escalator has had no passengers for a significant period of time.

* * * * *